UNITED STATES PATENT OFFICE.

EDWARD HACKING, OF PAWTUCKET, RHODE ISLAND.

ELECTRIC STORAGE BATTERY.

1,421,217.     Specification of Letters Patent.     Patented June 27, 1922.

No Drawing.     Application filed May 11, 1922. Serial No. 560,230.

*To all whom it may concern:*

Be it known that I, EDWARD HACKING, a citizen of the United States, residing at Pawtucket, in the county of Providence and State of Rhode Island, have invented certain new and useful Improvements in Electric Storage Batteries, of which the following is a specification.

My invention relates to an electrolyte for storage or secondary batteries, preferably those provided with metal plates cooperating with sulphuric acid.

The primary objects of my invention, besides those commonly sought, are to increase the life of the battery; to prevent the drying of the electrolyte; to make spilling of the contents impossible; to prevent creeping of the chemicals upon the plate posts of the battery; and to avoid the burning of the battery boxes or articles adjacent thereto.

To the above ends essentially my invention consists in such compositions of matter, and in such steps and combinations of steps as fall within the scope of the appended claims.

The present and preferred method of performing my novel invention is as follows. A solution is prepared consisting of mixing one ounce silicate of soda with two ounces of water. A second solution is prepared as follows. Six ounces of sulphuric acid of preferably approximately 1400 degrees Baumé has dissolved therein one-fourth of an ounce of bisulphate of mercury. Next there is mixed together one ounce of the above described solution number 1 with four ounces of the above described solution number 2.

This mixture is in liquid form and is poured into the battery cell, and covers the plates thereof, and is then allowed to set. that is to say, it assumes the consistency of a jelly. The time consumed in the setting is approximately about one-half hour.

After the composition has reached this stage there is poured into the battery cell three ounces of mineral oil, such, for instance, as mobile oil. The latter is poured upon the jelly and is immediately absorbed by the latter without destroying the jelly like condition of the electrolyte.

It will be understood that the quantities of the above mentioned ingredients may be changed within reasonable limits and that the ingredients may be changed to a reasonable extent and without departing from the spirit of my invention.

I claim:—

1. An electrolyte for electric storage batteries consisting of a gelatinous mass impregnated with mineral oil.

2. An electrolyte for electric storage batteries comprising a gelatinous mass containing sulphuric acid and permeated with mineral oil.

3. An electrolyte for electric storage batteries consisting of a gelatinous mass containing sulphuric acid and silicate of soda, and permeated with mineral oil.

4. An electrolyte for electric storage batteries consisting of a gelatinous mass of sulphuric acid, silicate of soda, and bisulphate of mercury, and pregnated with mineral oil.

5. The process of forming an electrolyte for electric storage batteries which consists in mixing silicate of soda with water, also dissolving bisulphate of mercury in sulphuric acid, uniting the mixtures and allowing them to form a gelatinous mass, and finally introducing mineral oil into the mass.

In testimony whereof I have affixed my signature.

EDWARD HACKING.